Sept. 1, 1959  G. L. TURNER  2,902,299
HOSE COUPLING ASSEMBLY
Filed April 19, 1955
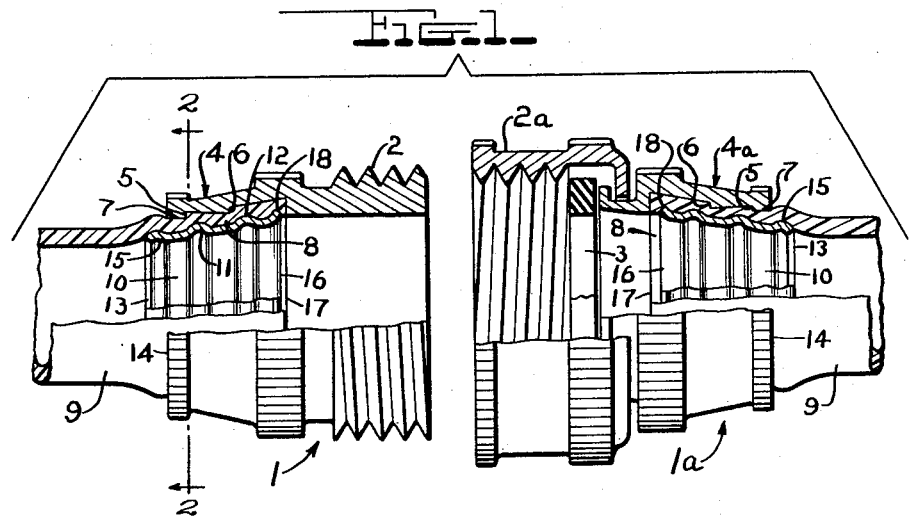
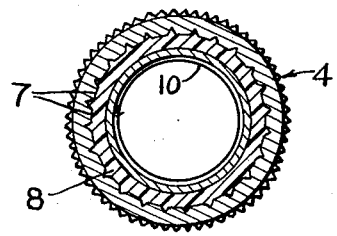
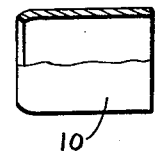
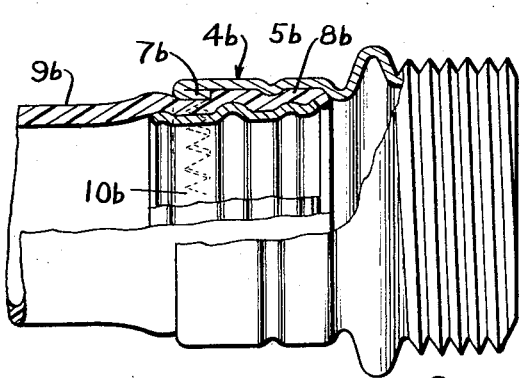
INVENTOR
George L. Turner
BY Roy A. Plant
ATTORNEY

United States Patent Office 2,902,299
Patented Sept. 1, 1959

2,902,299
HOSE COUPLING ASSEMBLY

George L. Turner, Hickory Corners, Mich., assignor to H. B. Sherman Manufacturing Company, Battle Creek, Mich., a corporation of Michigan Application August 19, 1955, Serial No. 529,449

4 Claims. (Cl. 285—258)

The present invention relates broadly to fastening means, and in its specific phases to a special form of hose coupling particularly adapted for mounting on garden hose.

There are two general types of permanently anchorable hose couplings with the common one involving the use of a ferrule on the outer face of the hose end and with the nipple or sleeve of the coupling inserted into the hose and expanded to firmly grip the hose between such nipple and ferrule. The other type, as typified by the H. B. Sherman Patent No. 743,401, of which the present invention is an improvement, involves a nipple or outer sleeve portion of the coupling body which fits over the outer face of the hose end while a ferrule or separate inner sleeve fits into the inside of the hose and is expanded to grip the hose firmly to the coupling nipple. With the advent of plastic and plastic covered hose, both of these types of constructions have given trouble due to the inherent flowability of plastic and also because it is slippery and hard to hold when wet. The older styles of these constructions also commonly resulted in short-lived assemblies due to cutting of the hose at the inner end of the nipple or ferrule portions of the coupling assembly under conditions of use. It was a recognition of these problems and difficulties which led to the conception and development of the present improved hose coupling construction.

In hose couplings of the type here involved, the outer sleeve or nipple may have an externally threaded outer end for engagement with a conventional swivelled nut on the corresponding sleeve or nipple of another hose section, to form a separable coupling, or may itself carry such a nut to engage threads on the sleeve or nipple of the other hose section, or the outer end of said outer sleeve or nipple could be stationarily mounted on a pump, sill cock, or other equipment to which a hose is to be connected. With the special construction of such assembly, as will be hereinafter described in detail, improved holding power on the hose is attained while cutting of the hose at the point of its entry into the coupling is minimized.

Accordingly among the objects of the present invention is the provision of an improved structure wherein the inner end of the inner sleeve or ferrule projects slightly beyond the inner end of the outer sleeve or nipple, and said projecting end is provided with an outwardly rounded bead which extends circumferentially of its outer periphery. This rounded bead engages the inner side of the hose so as to minimize injury to the latter during flexing of the hose with respect to the coupling.

In structures such as those previously proposed, the outer end of the inner sleeve or ferrule usually terminates far short of, as in the Sherman patent, or else at the same plane with the end extremity of the hose. In the present invention, however, the outer end of the inner sleeve preferably terminates in a slightly inwardly spaced relation with said end extremity of the hose, and said outer end of said inner sleeve is turned outwardly to provide a peripheral rib which is embedded in the hose, thereby aiding in tightly holding the hose and the outer sleeve against relative endwise sliding.

Another object of the invention has been to provide the inner periphery of the outer sleeve with a novel stepped formation, with the outer end larger than the inner, which provides circumferentially extending shoulders facing the enlarged outer end of said outer sleeve. These shoulders are embedded in the hose, under conditions of use, and coact with external beads formed on the inner sleeve, to effectively secure the hose and coupling against relative endwise sliding.

A still further object has been to provide the internally stepped outer sleeve with internal blunt teeth which are embedded in the hose and hold the latter against rotation with respect to said outer sleeve.

Still further objects and advantages of the invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of the various ways in which the principle of the invention may be used.

Figure 1 is a longitudinal sectional view, partly in elevation, showing a separable hose coupling improved in accordance with the present invention.

Figure 2 is a transverse section on line 2—2 of Figure 1, looking in the direction of the arrows.

Figure 3 is a partial side and partial sectional view of one of the inner sleeves or ferrules before expansion to operative size.

Figure 4 is a side elevation, partly in section, showing a different form of outer sleeve or nipple.

In Figure 1 complemental members 1 and 1a of a separable hose coupling have been shown, one having an external thread 2 and the other a swiveled nut 2a to couple them together in the usual way, with a washer 3 interposed between them. The thread 2 is on the outer end of the outer nipple or sleeve 4 of the coupling member 1, and the nut 2a is swiveled on the outer end of the outer sleeve 4a of the member 1a. Otherwise, the two coupling members 1 and 1a are of identical construction and a description of one will suffice, with the same reference numbers applied to both. To this end, the following description will be directed to the member 1.

The outer sleeve 4 is of internally stepped form, providing it with a generally tapered internal shape and with two shoulders 5 and 6, said shoulders facing toward the outer end of said outer sleeve 4. The shoulder 5 is near the inner end of the sleeve 4 and is preferably provided with blunt teeth 7 extending between said inner end and shoulder 5. The shoulders 5 and 6 and the blunt teeth 7 are embedded in the end portion 8 of the hose 9, which end portion is received within outer sleeve 4, which, as shown, is smaller in diameter in the portion carrying blunt teeth 7 than it is in the portion alongside the end portion of the hose 9.

An inner metal ferrule or sleeve 10, of substantially frusto-conical form in assembled position, is disposed within the end portion 8 of the hose 9 and is provided with outwardly pressed circumferentially extending beads 11 and 12 which coact with the shoulders 5 and 6 in tightly clamping said hose end portion 8.

The inner end 13 of the inner sleeve 10 projects a short distance beyond the inner end 14 of the outer sleeve 4. This projecting sleeve end 13 is preferably just sufficiently long to be provided with an outwardly pressed circumferentially extending bead 15 which is transversely rounded as shown. This bead 15 contacts with the inner side of the hose 9 and is preferably somewhat embedded therein. Due to this rounded bead, the inner end 13 of the inner sleeve 10 smoothly supports the hose 9 and minimizes cutting of same during flexing under conditions of use.

The outer end 16 of the inner sleeve 10 is preferably inwardly spaced from the extremity 17 of the hose end portion 8 and is turned outwardly to provide an external circumferential rib 18 which is embedded in the hose.

In Figure 4, a different form of outer sleeve 4b is shown coacting with the inner sleeve 10b in securing end 8b of the hose 9b. The outer sleeve 4b has an inwardly pressed bead 5b, and an inwardly folded toothed end 7b embedded in the hose for cooperating with inner sleeve 10b in holding hose 9b against movement relative thereto. Otherwise the construction corresponds to that above described with inner sleeve 10b of substantially frusto-conical shape for better holding power, and "free flow" of fluid therethrough.

It will be seen from the foregoing that an unusually tenacious connection has been provided between the hose and the coupling, that relative sliding of parts is substantially impossible since any sliding of the coupling in a direction off from the hose will tighten same, that relative rotation also is prohibited, and that cutting of the hose during flexing is minimized due to the outwardly rounded bead on the extended inner end of the inner sleeve.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. A hose and hose coupling assembly of the character described, wherein said coupling has a body portion and as a unit part of same a sleeve portion fitting the outer face of the hose end, said outer sleeve having at least one inwardly projecting shoulder portion substantially perpendicular to said hose, said shoulder also including means resisting rotation of said hose relative to said outer sleeve, and a separate substantially uniform thickness frusto-conical sheet metal inner sleeve gripping said hose end to said outer sleeve which is also smaller at its end than at its end alongside the outer end of said inner sleeve so as to be generally tapered, said shoulder portion of said outer sleeve facing the outer end of said coupling, said sheet metal inner sleeve having outward projecting rib means adjacent said shoulder and between same and the outer end of said coupling to resist movement of said hose out of said coupling, said sheet metal inner sleeve also extending beyond the inner end of said outer sleeve and having an outwardly projecting circumferential outwardly rounded sidewise projecting bead on its inner end to minimize cutting of said hose at the inner end of said coupling when said hose is flexed under normal conditions of use, the outer end of said sheet metal inner sleeve being spaced inward a short distance from the end extremity of said hose, said outer end of said inner sheet metal sleeve turning outwardly and providing a peripheral rib which is embedded in the inner periphery of the hose to grip same while facilitating fluid flow through said inner sleeve into said hose.

2. A structure as set forth in claim 1; wherein the inner end of said generally tapered outer sleeve is of return bend inward folded substantially uniform thickness sheet metal form which supplies a holding shoulder, said shoulder being provided with integral circumferentially spaced teeth having one side resting against the inner periphery of said sheet metal outer sleeve and facing the outer end of said outer sleeve, said teeth being embedded in the hose by said inner sheet metal sleeve to hold the latter against axial turning as well as endwise movement with respect to said outer sleeve, said outer sleeve having a small inwardly extending circumferential bead between its ends and also embedded in the hose, said inward folded sheet metal outer sleeve portion with its teeth, together with said bead, constituting said inwardly projecting holding portions of said hose engaging means of said outer sleeve.

3. In a hose and coupling sleeve assembly, an outer sleeve surrounding an end portion of the hose and having an inner surface smaller in diameter at its inner end than at its outer end alongside the end portion of said hose and having internal hose-engaging means, the outer end of said outer sleeve beyond the end of said hose having means for connecting it with another member, a separate, substantially uniform thickness, expanded sheet metal sleeve within and contacting tightly with the inner end portion of said hose, said sheet metal inner sleeve generally tapering toward its inner end with its outer end largest to better bind said hose end against said outer sleeve and at the same time facilitate fluid flow through said coupling into said hose, said inner sleeve holding the hose end portion tightly engaged with said internal hose-engaging means of said outer sleeve, the inner end of said inner sleeve projecting a short distance lengthwise into said hose beyond the inner end of said outer sleeve, said projecting end of said inner sleeve having an outwardly rounded sidewise projecting circumferential bead on its outer periphery, said outwardly rounded bead contacting with and extending into the inner periphery of the hose and substantially preventing said inner end of said inner sleeve from cutting the hose under normal conditions of use, the outer end of said inner sheet metal sleeve being spaced inwardly a short distance from the end extremity of said end portion of the hose within said outer sleeve, and said outer end of said inner sheet metal sleeve turning outwardly and providing a peripheral rib which is embedded in the inner periphery of the hose to grip same to said outer sleeve at the open end of said hose.

4. In a hose and coupling sleeve assembly, an outer sleeve surrounding one end portion of the hose and tapering generally inward gradually from its outer end and having internal hose-engaging means, the outer end of said outer sleeve beyond the end of said hose having means for connecting it with another member, a separate, substantially uniform thickness, expanded sheet metal sleeve within and contacting tightly with the inner end portion of said hose, said sheet metal inner sleeve generally tapering toward its inner end with its outer end largest to facilitate fluid flow through said coupling into said hose with said inner sleeve holding the hose end portion tightly engaged with said hose-engaging means of said tapered outer sleeve, the inner end of said inner sleeve projecting a short distance lengthwise into said hose beyond the inner end of said outer sleeve, said projecting end of said inner sleeve having an outwardly rounded sidewise projecting circumferential bead on its outer periphery, said outwardly rounded bead contacting with and extending into the inner periphery of the hose and substantially preventing said inner end of said inner sleeve from cutting the hose under normal conditions of use, the outer end of said inner sheet metal sleeve being spaced inwardly from the end extremity of said end portion of the hose within said outer sleeve, said outer end of said inner sheet metal sleeve turning outwardly and providing a peripheral rib which is embedded in the inner periphery of the hose, said inner sheet metal sleeve also having peripheral outward extending circumferential beads between its ends, and embedded in said inner periphery of the hose slightly nearer the outer end of said outer sleeve than the hose engaging means thereof to provide wedge holding action restraining pulling of the hose end out of the coupling sleeve.

References Cited in the file of this patent

UNITED STATES PATENTS

| | | |
|---|---|---|
| 182,723 | Tyler | Sept. 26, 1876 |
| 756,350 | Garbutt | Apr. 5, 1904 |
| 1,098,265 | James | May 26, 1914 |
| 1,504,363 | Madigan | Aug. 12, 1924 |
| 1,753,005 | Grady | Apr. 1, 1930 |
| 1,808,101 | Eastman | June 2, 1931 |
| 2,338,666 | Nelson | Jan. 4, 1944 |
| 2,551,536 | Harvey | May 1, 1951 |
| 2,623,837 | Butler | Dec. 30, 1952 |
| 2,631,047 | Spender | Mar. 30, 1953 |

FOREIGN PATENTS

| | | |
|---|---|---|
| 955,523 | France | June 27, 1949 |
| 1,084,003 | France | June 30, 1954 |

UNITED STATES PATENT OFFICE

CERTIFICATE OF CORRECTION

Patent No. 2,902,299

September 1, 1959

George L. Turner

It is hereby certified that error appears in the printed specification of the above numbered patent requiring correction and that the said Letters Patent should read as corrected below.

Column 3, line 66, after "at its", first occurrence, insert -- inner --.

Signed and sealed this 10th day of May 1960.

(SEAL)
Attest:

KARL H. AXLINE
Attesting Officer

ROBERT C. WATSON
Commissioner of Patents